United States Patent [19]

Plapp et al.

[11] Patent Number: 4,705,007
[45] Date of Patent: Nov. 10, 1987

[54] METHOD OF CONTROLLING TANK VENTING IN AN INTERNAL COMBUSTION ENGINE AND APPARATUS THEREFOR

[75] Inventors: Günther Plapp, Filderstadt; Botho Zichner, Schwieberdingen; Rüdiger Jautelat, Tamm; Rolf Kohler, Schwieberdingen; Alfred Kratt, Trossingen, all of Fed. Rep. of Germany; Hans-Martin Müller, Farmington Hills, Mich.

[73] Assignee: Robert Bosch GmbH, Stuttgart, Fed. Rep. of Germany

[21] Appl. No.: 866,577

[22] Filed: May 22, 1986

[30] Foreign Application Priority Data

May 31, 1985 [DE] Fed. Rep. of Germany ....... 3519475

[51] Int. Cl.$^4$ ............................................. F02M 39/00
[52] U.S. Cl. ..................................... 123/519; 123/520
[58] Field of Search ............... 123/519, 520, 516, 521, 123/518

[56] References Cited

U.S. PATENT DOCUMENTS

| | | | |
|---|---|---|---|
| 3,675,634 | 7/1972 | Tatsutomi | 123/519 |
| 3,680,318 | 8/1972 | Nakajima | 123/519 |
| 4,000,727 | 1/1977 | Walker | 123/519 |
| 4,318,383 | 3/1982 | Iritani | 123/520 |
| 4,326,489 | 4/1982 | Heitert | 123/520 |
| 4,467,769 | 8/1984 | Matsumura | 123/520 |
| 4,527,532 | 7/1985 | Fasai | 123/520 |

FOREIGN PATENT DOCUMENTS

| | | | |
|---|---|---|---|
| 0041724 | 3/1977 | Japan | 123/519 |
| 0110852 | 7/1983 | Japan | 123/519 |

Primary Examiner—Carl Stuart Miller
Attorney, Agent, or Firm—Walter Ottesen

[57] ABSTRACT

In a method and apparatus for controlling tank venting in internal combustion engines, a regenerative flow of fuel is released from the activated charcoal container to the negative-pressure side of the intake tube of the engine and an adaptation in the computer area for the fuel metering quantity simultaneously is prohibited, or vice versa, an adaptation is authorized and a regenerative fuel flow is prohibited, by cyclical triggering, as a function of whether the throttle flap angle drops below, or exceeds, a predetermined threshold value. Parallel to this, a continuous activated charcoal filter regeneration is provided that comes into play at relatively large air throughputs, by means of a branch line leading into the air filter area upstream of the throttle flap; furthermore, if the throttle flap angle threshold value is exceeded, both the regenerative fuel flow via the tank venting valve and the adaptation in the computer area are authorized.

8 Claims, 4 Drawing Figures

METHOD OF CONTROLLING TANK VENTING IN AN INTERNAL COMBUSTION ENGINE AND APPARATUS THEREFOR

FIELD OF THE INVENTION

The invention relates to a method and apparatus for controlling tank venting in internal combustion engines in which a regenerative flow of fuel from an activated charcoal filter in an intermediate storage means that receives fuel vapors from the tank is furnished to the intake area of the engine as a supplement to the fuel quantity. The fuel quantity is ascertained based on a characteristic field evaluation that is accessible to self-adaptation, either structurally or globally or both.

BACKGROUND OF THE INVENTION

In tank venting in internal combustion engines, it is known to vent the fuel vapors that form because of and as a function of certain parameters (fuel temperature, fuel quantity, vapor pressure, air pressure, flushing quantity, et cetera) not merely into the open air but instead to deliver them to the engine for reuse, preferably via an intermediate storage means filled with activated charcoal. The activated charcoal container receives the fuel vapors that form in the tank, for example when the vehicle is stopped, and typically communicates via a line with the intake region of the engine.

In this connection, it is also known to prevent or minimize a possible increase in exhaust gas emissions, due to such an increase in the quantity of fuel/air mixture resulting from tank venting, by permitting tank venting only at certain engine operating states. In this connection, reference can be made to "Motronic", C5/1, August 1981 and published German patent application DE-OS No. 28 29 958.

The intermediate storage container having the activated charcoal filter is in a position to store fuel vapors up to a certain maximum amount; flushing or regeneration of the filter during engine operation takes place as a result of the negative pressure developed by the engine in the intake area; to this end, the filter has a further opening to the ambient air. Necessarily, however, even if regeneration of the intermediate storage container is permitted only under certain operating conditions, this tank venting produces an additional quantity of fuel/air mixture; since this quantity is unmeasured, or cannot be measured at reasonable cost, the fuel metering signal (in a fuel injection system, for instance the duration of the injection control command $t_1$) which is normally prepared with very high accuracy, at high cost for computation, is made incorrect, as is the resultant fuel quantity delivered to the engine. At certain throttle flap angles, which can be associated with a predetermined threshold value $\alpha_{tank}$, the flows of fuel from the tank venting can have a quite substantial effect on the lambda value. An additional fuel quantity of this kind, which in particular also affects vehicle performance under certain conditions, and where in extreme cases the tank venting mixture may comprise virtually 100% air or 100% fuel vapor, is thus unacceptable, even if the influence of this disruptive factor is associated, for example, with the intake pipe pressure developed by the engine, or if the delivery of the tank venting mixture is precluded entirely in particularly sensitive operating states, such as idling, by providing an electronic on/off control. Furthermore, tank venting operation in general is particularly disruptive in certain internal combustion engine fuel metering systems which, in order to effect the actual determination of the quantity of fuel to be delivered to the engine at every instant, as a function of rpm and the load status, evaluate characteristic fields which in a feedback learning process (known as adaptation) are amenable to further general and structural adaptation. This adaptation is typically effected by evaluating an actual value signal, for instance deriving from a lambda sensor; the adaptation will necessarily be defective if an arbitrarily variable figure is additionally used to determine the actual value.

SUMMARY OF THE INVENTION

It is accordingly the object of the invention to configure the tank venting control in a method and an apparatus of the kind discussed above such that on the one hand there is no disruptive effect on engine operation and, on the other hand, even in sensitive operating states such as idling, both adaptation and tank venting are possible.

The invention achieves this object as described hereinafter, with the advantage of addressing the problem of tank venting control in a simple manner and enabling its integration into the fuel supply to the engine, with the minor expense for a time control means, in such a way that regeneration of the activated charcoal container takes place at all operating states, and in particular during idling; yet simultaneously, self-adaptation in the area of the computed fuel metering remains reliably unaffected.

If the venting lines of the activated charcoal filter acting as the intermediate storage means for the fuel vapors are especially arranged mechanically, directly into the intake pipe downstream of the throttle flap, first so as to receive larger flows via the air filter and second via a controlled valve, such as a three-way valve and a mixing container that avoids abrupt changes in the mixture, then reliable control of tank venting is possible without complicated open-loop and closed-loop control provisions.

In a particularly advantageous feature of the invention, continuous regeneration of the activated charcoal filter is possible via a line of large cross section leading to the air filter; this effect is attained only with relatively large throughput, however, and in the event of partial load or idling regeneration, a cyclical control of venting takes place via the mixing container.

BRIEF DESCRIPTION OF THE DRAWING

The invention will now be described with reference to the drawing wherein.

DESCRIPTION OF THE PREFERRED EMBODIMENTS OF THE INVENTION

The basic concept of the invention is to permit both regeneration of the activated charcoal filter and adaptation in the characteristic field computer by means of a simple control of the throttle flap angle, combined with a specialized mechanical arrangement of lines from the activated charcoal filter into the intake region of the engine and including a cyclical control over time, in all operating states of the engine, including idling.

The invention is particularly well suited for use in fuel metering systems of the kind where there is an ongoing indication of the throttle flap angle, which is evaluated typically along with an indication of engine speed in rpm, in order to calculate the quantity of fuel to be delivered to the engine.

Figure 1:
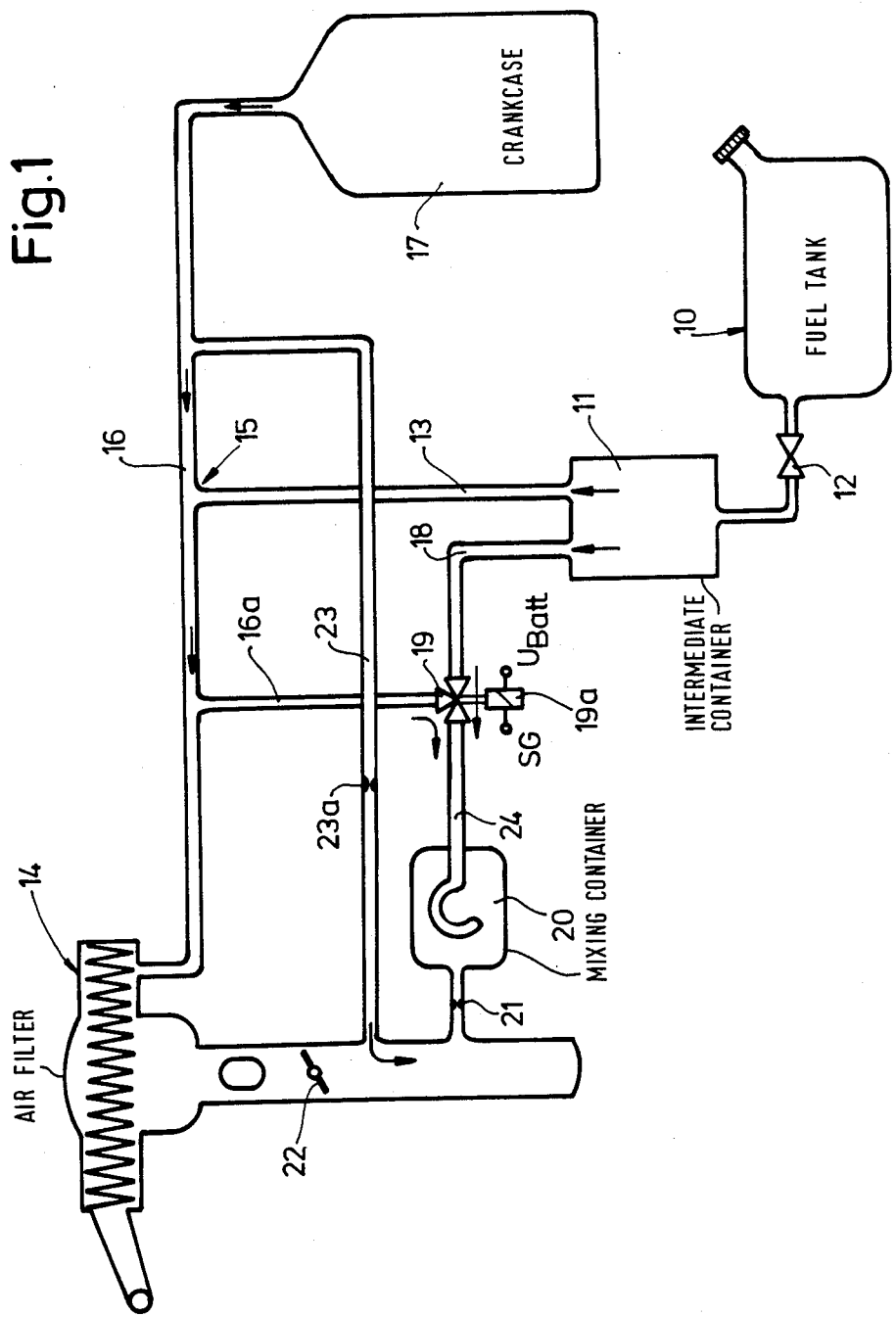
FIG. 1 is a schematic showing a first embodiment of an arrangement of tank venting components with respect to the intake region of an internal combustion engine including crankcase venting means.

FIG. 1 shows a fuel tank 10 and an intermediate container 11, in the form of an activated charcoal filter, which receives fuel vapors from the tank 10 via an intermediate overpressure valve 12 that opens for instance at $\Delta p > 15$ mbar. The activated charcoal filter 11, as the intermediate container will henceforth be called, communicates continuously with the air filter 14 via a first line 13 having a comparatively large cross section and can be regenerated continuously via this line 13. At 15, the line 13 discharges into a further venting line 16 leading to the air filter 14; this line represents the crankcase venting line, and the crankcase is shown at 17. The configuration or operation of these venting lines 13, 16 leading to the air filter is such that venting or regeneration occurs only at relatively high throughput ($\dot{m}_L$).

In order to enable regeneration at partial load (TL) and idling (LL), a further line 18 leads from the activated charcoal filter 11 to a mixing container 20 via a valve, which is embodied as a three-way valve in the embodiment of FIG. 1. The mixing container 20 communicates via a throttle 21 with a location in the intake tube below the throttle flap 22; at this location, if the throttle flap 22 is fully or partially closed, a negative pressure resulting from the aspirating action of the engine prevails as an example of a numerical value; this negative pressure may be at a level of $p_s = 300$ mbar. The pressure in the area of the air filter, under these operating conditions, is typically at a level of $p_{amb} \approx 1000$ mbar, and it decreases slightly only at relatively large throughputs; this then makes it possible to vent the crankcase and regenerate the activated charcoal filter via the air filter 14.

A further line 23 leads to the negative-pressure side of the intake pipe, branching off from the crankcase venting line 16; via a throttle 23a, this line 23 allows a portion of the crankcase venting into the negative-pressure area of the intake pipe at the operating states of partial load and idling.

The mixing container 20 is embodied such that it avoids an abrupt change in the mixture when tank venting is directed to it or away from it via the valve 19. The mixing container 20 does this by making a relatively large space available, into which the partial line 24 leading from the valve 19 discharges, preferably with the discharge area being located in the counterflow direction, so that with the inclusion of the throttle 21, which enables only a gradual venting of the mixing container 20, the changes in the mixture thereby brought about take place so gradually in terms of steepness that this path of activated charcoal regeneration permits only a gradual variation of the mixture, one that would be represented by a curve with only a ramp-like slope adapted to the typical lambda regulation slope. Thus, the lambda regulation, which is always present, is allowed time for calculation in performing an appropriate adaptation in the fuel metering system.

Figure 3:
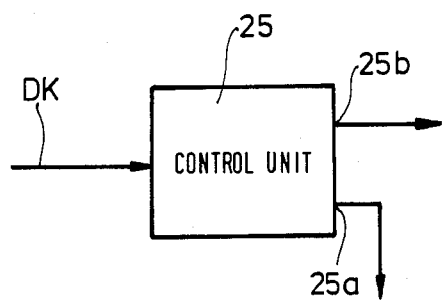
FIG. 3 is a simplified view of an embodiment of the electronic control circuit dependent on the throttle flap angle; and, FIG. 4, in the form of diagrams, illustrates the cyclical control, over time, for the tank venting valve as well as for the regeneration and adaptation phase.

Triggering of the three-way valve 19 is effected by a corresponding signal applied to the magnetic portion 19a of the valve by the control unit 25 for tank venting, which is shown in simplified form in FIG. 3. All that needs to be added to such a signal is a throttle flap signal DK, because in the purely throttle flap angle control according to the invention, no further data relating to other engine conditions are needed in effecting tank venting.

Figure 4:
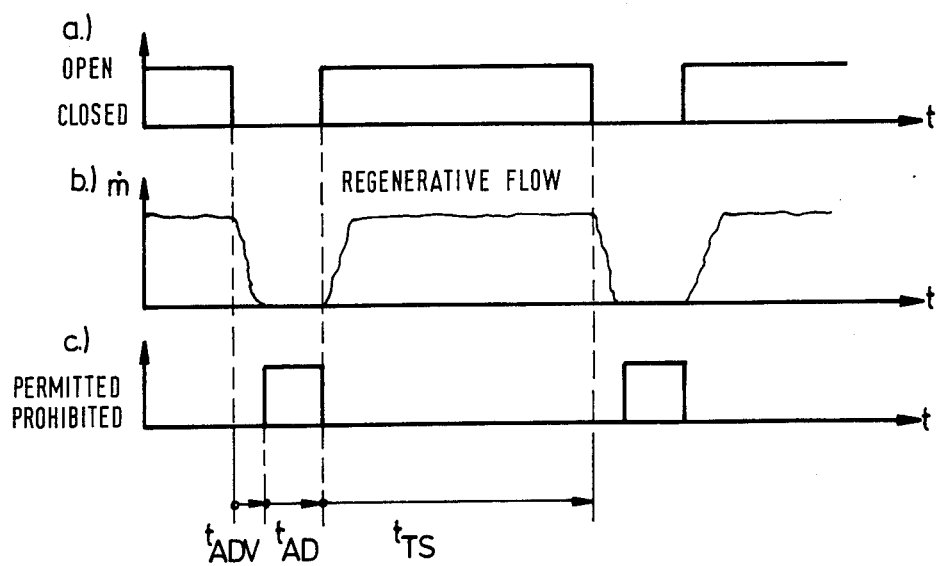

The basic function that results is as follows. Since the lambda value is substantially affected by the tank venting, fuel flows if a certain throttle flap angle, which is symbolized here as $\alpha_{tank}$, drops below a predetermined angle, then no adaptation (neither structural nor general) must be allowed in the area of calculating the fuel quantity to be supplied, at throttle flap positions below the threshold value, as long as a regenerative flow from the activated charcoal filter 11 is taking place. The control unit 25 therefore contains a cyclical time course control, which at these operating conditions (which can be either partial load or engine idling) triggers the valve 19 as shown in the diagram of FIG. 4. A regeneration phase of predetermined duration, for example, five minutes, is followed by an adaptation phase, again of predetermined duration and typically shorter (for instance, 1 minute), and so on, alternating constantly.

In FIG. 4, at (a) the switching state of the tank venting valve 19 is shown between open (preferably a non-triggered state, connecting the venting line 18 and the mixing container via the valve 19) and closed (triggered by the control unit); in this switching position, both lines 18 (leading from the activated charcoal filter 11) and 16a (branch line leading from the crankcase venting line 16 to the three-way valve 19) are blocked.

In (b) in FIG. 4, the regenerative flow $\dot{m}$ from the activated charcoal filter 11 then drops down to zero, so that as represented by the curve course in (c) of FIG. 4, after a predetermined delay period $t_{ADV}$ after the closure of the tank venting valve 19, the signal "adaptation authorized" is emitted for the duration of the adaptation period $t_{AD}$ by the control unit 25 at the output connection 25a. The triggering of the tank venting valve 19 here is effected from the output connection 25b.

After the adaptation authorization has elapsed (duration $t_{AD}$), the control unit 25 cyclically switches back again to the regeneration phase and opens the tank venting valve for the ensuing tank venting period $t_{TS}$, and the entire operation is repeated cyclically as long as a predetermined throttle flap threshold value position is not exceeded.

As soon as this throttle flap value is exceeded, the control unit 25, without any time delay, rescinds the order not to perform adaptation and no longer triggers the tank venting valve, which as a rule, as already mentioned, is configured such that it is open when without current. The cyclical time course control in the control unit 25 is configured such that it continues in force until the end of the tank venting time $t_{TS}$ and then remains at this point. Only when a throttle flap angle value that again drops below the predetermined threshold value $\alpha_{tank}$ is present at the input of the control unit 25 does the time control begin again, with the elapse of the delay period $t_{ADV}$; in other words, shifting cyclically into the control course shown in FIG. 4, but on the condition that whenever the throttle valve angle falls below the predetermined throttle flap threshold value $\alpha_{tank}$ at an instant at which the tank venting time $t_{TS}$ has not yet elapsed, adaptation is once again immediately forbidden, and the tank venting is opened, with a corresponding transition to normal time course control.

The following data relate to some numerical indications of the variable values between which these times can vary. An rpm-dependent setting of these times is also possible, for instance, in order to be able to perform predetermined time cycles even with frequent actuation of the gas pedal and a corresponding change in throttle flap position, such as may occur in city driving.

Figure 2:
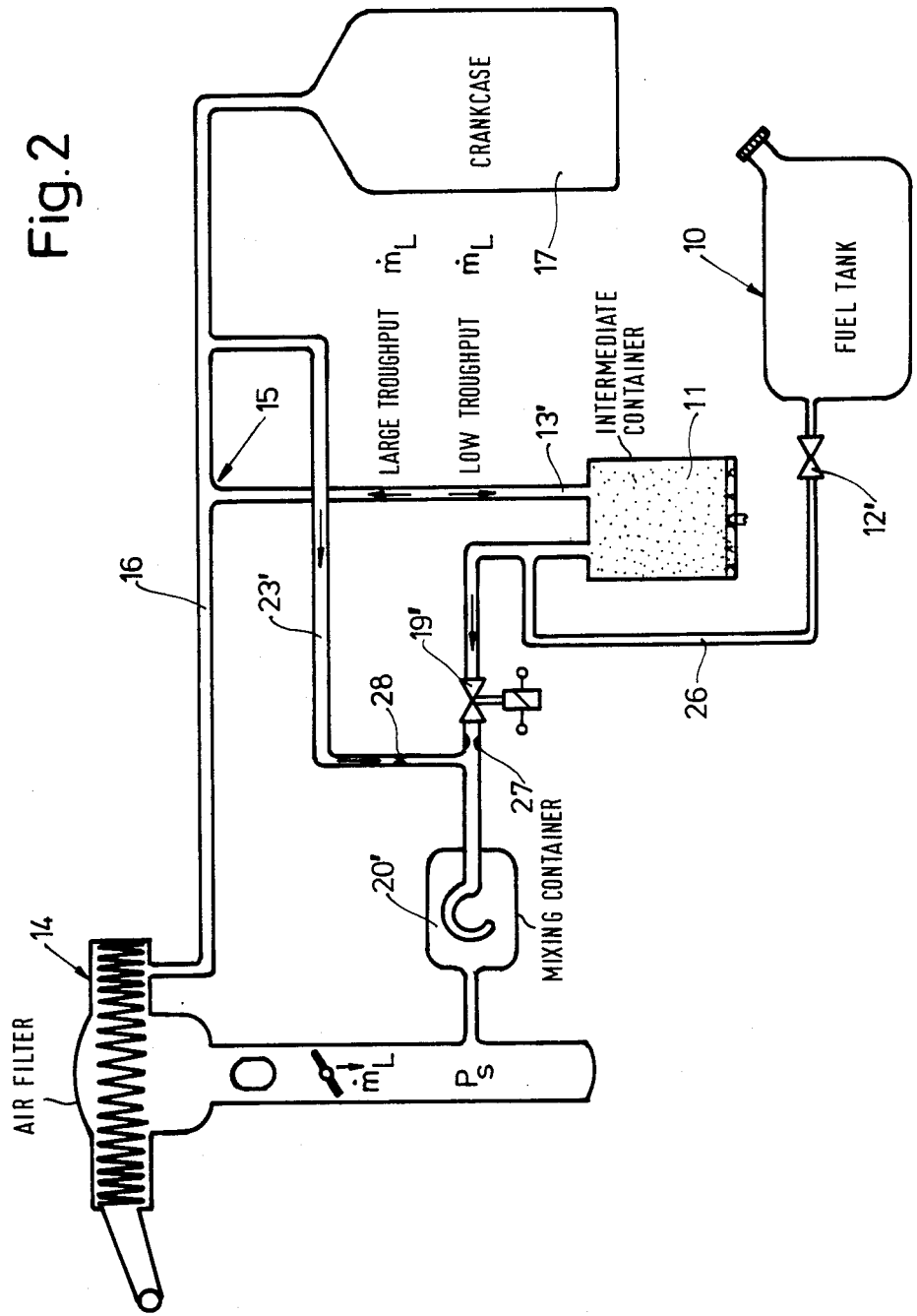
FIG. 2 shows a second embodiment corresponding to that of FIG. 1 but with the lines arranged slightly differently.

$t_{ADV}: 0s < t_{ADV} < 20\ s\quad \Delta t_{ADV} \cong 1\ s$
$t_{AD}: 10s < t_{AD} < 2\ min\quad \Delta t_{AD} \cong 10\ s$
$t_{TS}: 10s < t_{TS} < 10\ min$ The exemplary embodiment of the line arrangement shown in FIG. 2 differs from that of FIG. 1, while retaining the same reference numerals for identical components and providing the reference numerals of components having only a slight change in their structure or operation with a prime, only in that the venting valve 19' here is a one-way blocking valve. This valve 19' permits the flow of fuel out of the activated charcoal filter 11 or, as already mentioned, out of a parallel line 26 leading in via an overpressure valve 12' directly from the tank, bypassing the activated charcoal filter, via a throttle restriction 27 to the mixing container 20', which discharges without throttle into the negative-pressure side of the intake tube. On the other side, the branch line 23' from the tank venting line 16 to the air filter 14 is also directed into the mixing container 20' via a throttle 28, with the function of the branch line 13 being such that at large throughputs $\dot{m}_L$, that is, at a large air throughput through the air filter 14, the course of the flow is from the activated charcoal filter 11 to the crankcase venting line 16, while at small throughputs, such as those indicated by arrows extending in the opposite direction, the flow is in the opposite direction, from the crankcase venting line 16 via the activated charcoal filter 11, the venting valve 19' and the throttle 27 to the mixing container 20', and from there to the negative-pressure side of the intake tube.

These various line courses assure that effective control of tank venting is possible only by monitoring the throttle flap angle, without disruptive effects on adaptation performance in the area of calculating the actual fuel delivery.

For the sake of providing further data indicating the limits of the throughput ranges, it should be noted that small air throughputs, in the form of intake tube negative pressure $p_s$, become noticeable within the following limits:

$\dot{m}_L$ small: $300\ mbar < p_s < 600\ mbar$ and large throughputs are attained within the following limits:

$\dot{m}_L$ large: $600\ mbar < p_s < 1000\ mbar$

These thresholds are recognized by means of the throttle flap position.

It is understood that the foregoing description is that of the preferred embodiments of the invention and that various changes and modifications may be made thereto without departing from the spirit and scope of the invention as defined in the appended claims.

What is claimed is:

1. Method of controlling the venting of a tank in an internal combustion engine comprising:

determining a fuel quantity for the engine from a characteristic field evaluation, which is accessible to self-adaptation;

supplementing said fuel quantity with a regenerative fuel flow from an intermediate container receiving the fuel vapors from the tank and supplying said regenerative fuel flow to the engine at the intake region;

admitting said regenerative fuel flow into said intake region by means of a cyclical time control for a predetermined time duration;

continuously interrupting the admission of said regenerative fuel flow with permitted adaptation phases for the characteristic field evaluation;

said regenerative fuel flow being admitted to said intake region via a valve when there is a drop below a predetermined throttle flap angular position $(\alpha < \alpha_{tank})$;

said self-adaptation being selected from the group consisting of structural self-adaptation and global self-adaptation; and, said intermediate container being an active charcoal filter;

said valve being a tank-venting valve, said permitted adaptation phases being in the computer region for the metered fuel quantity and being initiated with a predetermined time delay ($t_{ADV}$) after said valve is interrupted; and, providing the possibility of an uninterrupted regenerative fuel flow from said active charcoal filter when the predetermined tank venting threshold in the form of a throttle flap angular position threshold value ($\alpha_{tank}$) is exceeded.

2. Method of controlling the venting of a tank in an internal combustion engine comprising:

determining a fuel quantity for the engine from a characteristic field evaluation, which is accessible to self-adaptation;

supplementing said fuel quantity with a regenerative fuel flow from an intermediate container receiving the fuel vapors from the tank and supplying said regenerative fuel flow to the engine at the intake region;

admitting said regenerative fuel flow into said intake region by means of a cyclical time control for a predetermined time duration;

continuously interrupting the admission of said regenerative fuel flow with permitted adaptation phases for the characteristic field evaluation;

said regenerative fuel flow being admitted to said intake region via a valve when there is a drop below a predetermined throttle flap angular position $(\alpha < \alpha_{tank})$;

said self-adaptation being selected from the group consisting of structural self-adaptation and global self-adaptation; and, said intermediate container being an active charcoal filter; and, said engine including a mixing container associated with said valve, said engine further having a crankcase and the venting thereof being directed to said valve in the region of said mixing container, said venting of said crankcase and said regenerative fuel flow being conjointly directed from said mixing container via a throttle to said low-pressure end of said suction tube.

3. Apparatus for controlling the venting of a tank of an internal combustion engine having a suction tube with a throttle flap mounted therein, the engine further having a computer associated therewith for determining the quantity of fuel metered to the engine, the apparatus comprising:

an active charcoal filter for receiving the fuel vapors from the tank and for supplying a regenerative fuel flow;

a connecting line connecting said charcoal filter to said suction tube at the low-pressure end thereof for conducting said regenerative fuel flow;

a tank venting valve disposed in said connecting line;

a control device for controlling said venting valve and including time control means for responding when there is a drop below a predetermined angular-position threshold value of said throttle flap;

said time control means being configured for opening and closing said valve in cyclical operation with a simultaneous output of a corresponding adaptation prohibition or a permitted adaptation; and, an air filter and a second connecting line connecting said charcoal filter to said air filter for enabling a regenerative fuel flow from said active charcoal filter parallel to the time-controlled throughput release with smaller air throughputs for large air throughputs.

4. Apparatus for controlling the venting of a tank of an internal combustion engine having a suction tube with a throttle flap mounted therein, the engine further having a computer associated therewith for determining the quantity of fuel metered to the engine, the apparatus comprising:

an active charcoal filter for receiving the fuel vapors from the tank and for supplying a regenerative fuel flow;

a connecting line connecting said charcoal filter to said suction tube at the low-pressure end thereof for conducting said regenerative fuel flow;

a tank venting valve disposed in said connecting line;

a control device for controlling said venting valve and including time control means for responding when there is a drop below a predetermined angular-position threshold value of said throttle flap;

said time control means being configured for opening and closing said valve in cyclical operation with a simultaneous output of a corresponding adaptation prohibition or a permitted adaptation; and, a mixing container disposed between said valve and said low-pressure end of said suction tube; an ancillary line connecting said valve to said mixing container; first throttle means for throttling the flow through said ancillary connecting line; said valve being a check valve for opening or closing said ancillary line to said mixing container; a branch line interconnecting said venting line and said mixing container; and, second throttling means disposed in said branch line for throttling the flow therethrough.

5. The apparatus of claim 3, the engine having a crankcase and a venting line connecting the latter to the air filter, said second connecting line communicating with said venting line.

6. The apparatus of claim 5, said venting valve being a three-way valve and said apparatus comprising: a mixing container having a predetermined inner volume for preventing a jump-like change in the mixture; throttle means for connecting said mixing container to said low-pressure side of said suction tube downstream of said throttle flap; and, a transverse line communicating with said venting line; said three-way valve being arranged for connecting said transverse line and said charcoal filter to said mixing container.

7. The apparatus of claim 6, an additional connecting line for connecting said valve to said mixing container, said additional connecting line having an end portion disposed in said mixing container, said end portion having a loop-like shape and an end opening communicating with the interior of said mixing container, said end portion being arranged in said interior so as to open thereinto in a direction opposite to the direction of flow through said additional connecting line.

8. The apparatus of claim 5, comprising an ancillary line arranged between said venting line and said low-pressure end of said suction tube.

* * * * *